Patented Dec. 26, 1950

2,536,010

UNITED STATES PATENT OFFICE 2,536,010

PREPARATION OF AZINE DYESTUFF IMAGES

Willy A. Schmidt and Joseph A. Sprung, Easton, Pa., assignors to General Aniline & Film Corporation, New York, N. Y., a corporation of Delaware No Drawing. Application July 11, 1947, Serial No. 760,508

8 Claims. (Cl. 95—6)

The present invention relates to color photography and more particularly to color-formers capable of yielding azine dyestuff images when present during the development by means of primary aromatic amines of an exposed silver halide emulsion.

Our copending application Serial No. 577,134, filed February 9, 1945, now abandoned, discloses the preparation of azine dyestuff images by color-forming development of an exposed silver halide emulsion in the presence of a color-former which is an aromatic amine containing in meta-position to the amino group, the grouping —NHZ wherein Z is a substituent which is more electronegative than hydrogen, such as, phenyl, acyl, cyano, and the like. It is also stated in said application that similar results may be achieved when replacing the amino color-formers by phenolic color-formers and in this connection reference was made to the employment as a color-former of 3'-hydroxy-benzenesulfon-p-toluidide.

Rather peculiarly, however, it has been ascertained that azine dye formation by ring closure of the intermediary-formed quinoneimine only takes place with the phenolic color-formers when the carbon atom in meta-position to the phenolic hydroxyl group is substituted by a sulfonamido grouping, to wit, the grouping —NH SO$_2$R, wherein R has the value subsequently enumerated. The particular reason for this phenomenon is not readily apparent. It would appear, however, that the phenolic hydroxyl group on 1-position is not as powerful as the amino group in directing ring closure and that it is only capable of so operating when the meta-position of the phenol is substituted by the strongly electron-drawing sulfonamido group. Despite the theory which is involved, it is a fact that the only phenols which we have been able to effectively employ in the preparation of azine dye images by the color-forming development method are those in which the position meta to the hydroxyl group is substituted by the aforesaid sulfonamido group.

It is, accordingly, an object of the present invention to produce azine dyestuff images by the color development of a silver halide emulsion containing an aromatic phenol bearing in meta-position to the hydroxyl group a sulfonamido group.

It is a further object of the present invention to provide silver halide emulsions containing as color-formers aromatic phenols substituted in meta-position to the phenolic group by a sulfonamido group and which when reacted with the oxidation products of a primary aromatic amino developer yield azine dyestuff images.

A further object of the invention is the provision of color developers containing a primary aromatic amino developer and as a color-former an aromatic phenol containing in meta-position to the phenolic hydroxyl group a sulfonamido group which upon reaction with the oxidation products of the developer yield azine dyestuff images.

Other and more important objects of the invention will become apparent as the description proceeds.

The color-formers which are contemplated by the present invention are typified by the following formulae:

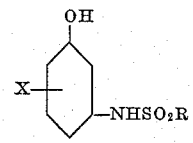

and

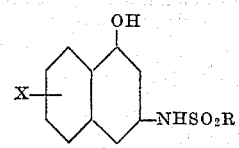

wherein R is aliphatic, such as, methyl, ethyl, propyl, butyl, amyl, octyl, decyl, dodecyl, tetradecyl, octadecyl, and the like, or aromatic, such as, phenyl or naphthyl, acylphenyl, such as, acetylphenyl, propionylphenyl, and the like, alkylphenyl, such as, toluyl, ethylphenyl, and the like, acylaminophenyl, such as, acetylaminophenyl, laurylaminophenyl, stearylaminophenyl, and the like, and X is hydrogen, alkyl, such as, methyl, ethyl, propyl, butyl, and the like, aromatic as above, or sulfo.

Examples of compounds falling within the above category and which we have found to be suitable for the production of the desired azine dyestuff images are the following:

(1)
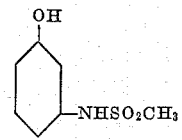

3'-hydroxymethanesulfonanilide (2)
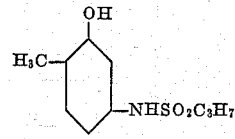

3'-hydroxypropanesulfon-p-toluidide (3) 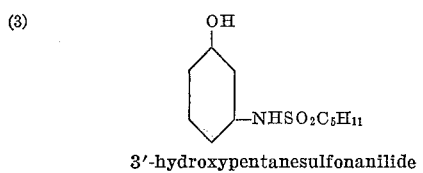
3'-hydroxypentanesulfonanilide (4) 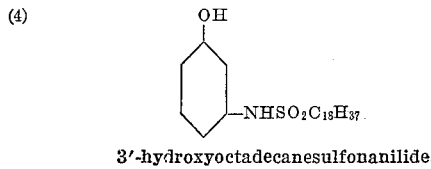
3'-hydroxyoctadecanesulfonanilide (5) 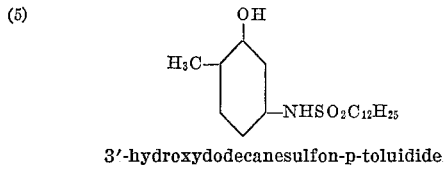
3'-hydroxydodecanesulfon-p-toluidide (6) 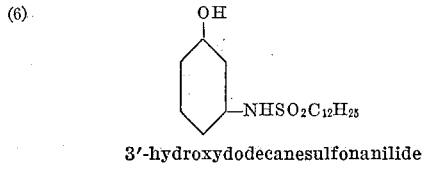
3'-hydroxydodecanesulfonanilide (7) 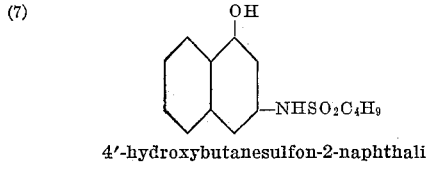
4'-hydroxybutanesulfon-2-naphthalide (8) 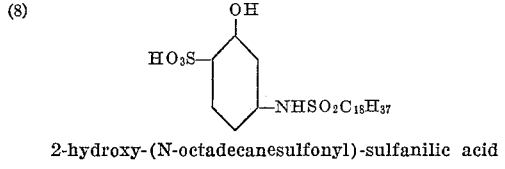
2-hydroxy-(N-octadecanesulfonyl)-sulfanilic acid (9) 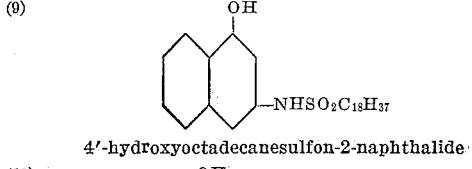
4'-hydroxyoctadecanesulfon-2-naphthalide

(10) 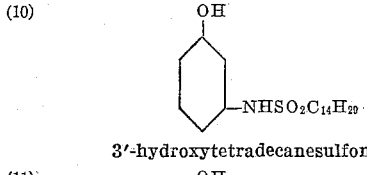
3'-hydroxytetradecanesulfonanilide

(11) 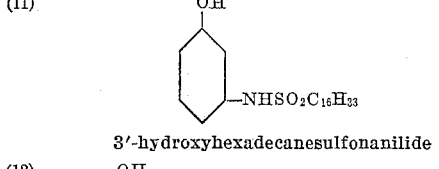
3'-hydroxyhexadecanesulfonanilide

(12) 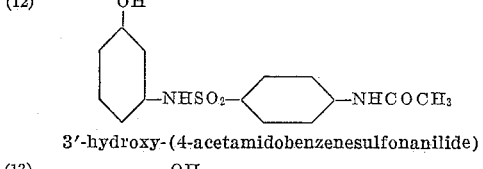
3'-hydroxy-(4-acetamidobenzenesulfonanilide)

(13) 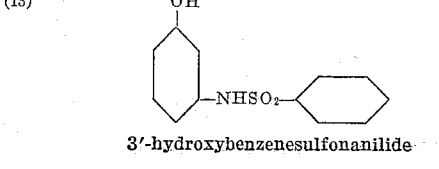
3'-hydroxybenzenesulfonanilide

(14) 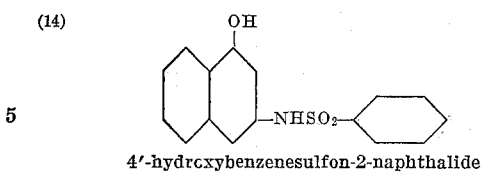
4'-hydroxybenzenesulfon-2-naphthalide

(15) 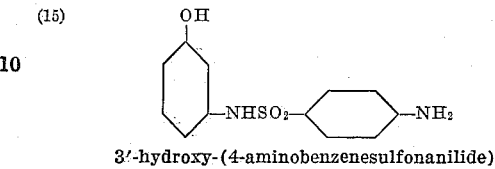
3'-hydroxy-(4-aminobenzenesulfonanilide)

(16) 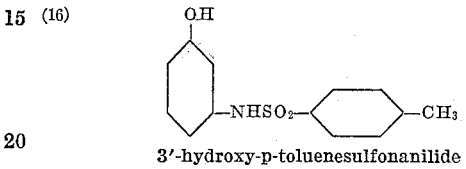
3'-hydroxy-p-toluenesulfonanilide

(17) 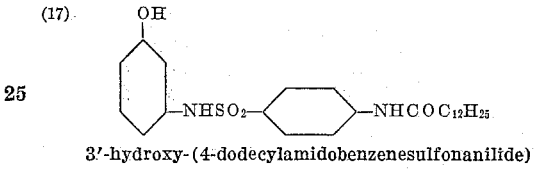
3'-hydroxy-(4-dodecylamidobenzenesulfonanilide)

(18) 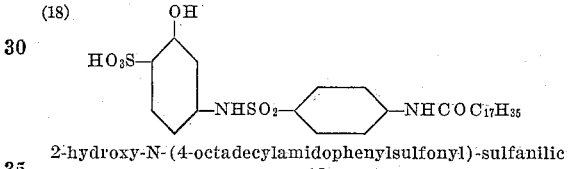
2-hydroxy-N-(4-octadecylamidophenylsulfonyl)-sulfanilic acid

(19) 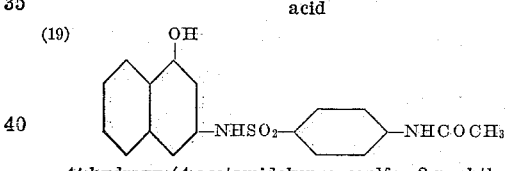
4'-hydroxy-(4-acetamidobenzenesulfon-2-naphthalide)

These compounds can be prepared by methods usual in the art. For instance, the alkylsulfonyl-amino-phenols are prepared by condensing the corresponding alkylsulfonyl chloride with the desired 3-amino-phenol. The preparation of substituted 3-amino-1-naphthols such as

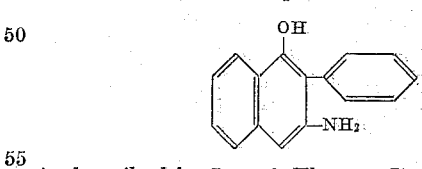

is described by Lees & Thorpe, J. Chem. Soc. 91, 1303 (1907). An effective method for preparing the alkylsulfonyl chlorides involves the heating to a temperature of about 200° C. of the involved alkyl halide with sodium sulfite to produce the corresponding sodium sulfonate. The sodium sulfonate is then treated with phosphorus pentachloride by heating preferably to a temperature of a steam bath.

The aromatic sulfonamido phenols are prepared by reacting the corresponding arylsulfonyl chlorides upon the desired 3-amino-phenols. In the compounds like those of 17, 18 and 19 the acylamino group at the end of the chain is introduced as the last step while employing for this purpose the corresponding acyl chloride.

The reaction by which the azine dyestuffs are produced involves two conversions which may take place spontaneously or in an observable sequence. The first reaction involves the conventional formation of the quinoneimine dye and the second the ring closure of the quinoneimine to the desired azine. Often in order to effect the second reaction, it is desirable to treat the quinoneimine with an alkali, such as, sodium hydroxide. The azine formed may be present as the anhydride but upon acidification the true azine salt is formed which possesses a characteristically brilliant color.

The invention may be realized in various ways. One method of effecting the formation of the azine dyestuff images comprises exposing a silver halide emulsion and subjecting it to the action of a primary aromatic amino developer containing one of the aforesaid color-forming components. Again, the silver halide emulsion may be exposed, developed to black and white and subsequently subjected to the action of such a color developer. On the other hand, the color-forming component may be incorporated in the emulsion and after exposure subjected to the action of a primary aromatic amino developer.

It is, of course, evident that in the latter case it is necessary to employ the color-forming components in a form in which they are fast to diffusion in the photographic emulsion. Methods by which this result may be achieved are disclosed in U. S. P. 2,186,852, 2,186,851, 2,186,849, 2,186,734, 2,186,733, 2,186,732, 2,179,244, and the like. It is preferred, however, to make the color-formers fast to diffusion by incorporating into the molecule of the phenol a radical having an alkyl chain of 5 carbon atoms or more, preferably 12 or more, such as, dodecyl, myristyl, stearyl, oleyl, octadecyl, or the like. The long alkyl chain may be present in the sulfonamido group as indicated above or may appear as a substituent in another position of the molecule.

To facilitate the incorporation of the color-formers in the emulsions or in the developer, the compounds may contain substituents which increase their solubility in aqueous solutions. Such groups are, for instance, sulfonic acid groups, carboxylic acid groups, hydroxy polyethenoxy ether groups and the like. Examples of compounds containing water-solubilizing groups other than the sulfonamido group have been mentioned above.

The following examples will serve to illustrate the invention but it is to be understood that the invention is not limited thereto.

*Example I*

To 100 g. of a photographic silver halide emulsion is added 0.5 gram of 3'-hydroxyoctadecanesulfonanilide. The emulsion is then coated on a transparent film base and dried. After exposure the film is developed in a color-forming developer comprising

| | | |
|---|---|---|
| Water | cc | 1,000 |
| Sodium sulphite | g | 0.5 |
| p-Diethylaminoaniline | g | 2.5 |
| Sodium carbonate | g | 70 |
| Potassium bromide | g | 2.5 |

A silver plus a purple quinoneimine dye image is formed. Upon treatment with sodium hydroxide a brown azine dye was obtained. Upon removal of the silver by bleaching in potassium ferricyanide solution and subsequent fixing, a bluish-magenta azine dye resulted.

*Example II*

An exposed photographic silver bromide emulsion was developed in a color-forming developer of the following composition:

| | | |
|---|---|---|
| Water | cc | 1,000 |
| Sodium sulphite | g | 0.5 |
| p-Diethylaminoaniline | g | 2.5 |
| Sodium carbonate | g | 70 |
| Potassium bromide | g | 2.5 |
| 3'-Hydroxy-p-toluenesulfonanilide | g | 1 |

The image first appears bluish-black, then turns to brownish-black. After removal of the silver image, a blue-magenta dye image remains. Upon immersion into dilute hydrochloric acid, a reddish-orange dye image appears.

*Example III*

The procedure is the same as in Example I excepting that there is employed 3-hydroxydodecanesulfonanilide. The final azine dye image obtained is bluish-magenta.

*Example IV*

The procedure is the same as in Example I excepting that there is employed 2-hydroxy-N-(octadecylsulfonyl)-sulfanilic acid. By processing as in Example I a red-magenta azine dye is obtained.

*Example V*

The procedure is the same as in Example I except that there is employed 3'-hydroxy-(4-stearamidobenzenesulfonanilide). A bluish-magenta azine dye image is obtained.

*Example VI*

The procedure is the same as in Example I except that there is employed 3'-hydroxy-(4-myristamidobenzenesulfonanilide). The final azine dye image obtained is bluish-magenta.

*Example VII*

The procedure is the same as in Example II except that there is employed 3'-hydroxy-(4-acetamidobenzenesulfonanilide). The final azine dye image obtained is reddish-orange.

*Example VIII*

The procedure is the same as in Example II except that there is employed 3'-hydroxy-(4-aminobenzenesulfonanilide). The final azine dye image obtained is reddish-orange.

*Example IX*

The procedure is the same as in Example I except that 3'-hydroxy-4'-sulfo-(4-myristamidobenzenesulfonanilide) is employed. The final azine dye image obtained is bluish-magenta.

Various modifications of the invention will occur to persons skilled in the art and we, therefore, do not intend to be limited in the patent granted except as necessitated by the appended claims.

We claim:

1. The process of producing azine dyestuff images in a photographic silver halide emulsion which comprises exposing the emulsion and developing the same with a primary aromatic amino developer in the presence of an aromatic phenol capable of coupling in the 4-position and containing a sulfonamido group, the nitrogen atom of which is directly linked to the carbon atom in meta-position to the phenolic hydroxyl group.

2. A photographic silver halide emulsion containing an aromatic phenol capable of reacting in the 4-position with the oxidation products of a primary aromatic amino developer to produce an azine dye, said phenol having a sulfonamido group, the nitrogen atom of which is directly linked to the carbon atom in meta-position to the phenolic hydroxyl group and said phenol containing a radical rendering it fast to diffusion in the photographic emulsion.

3. A photographic developer containing a primary aromatic amino developing compound and an aromatic color-forming component capable of reacting in the 4-position with the oxidation products of said developing compound to yield an azine dye and comprising an aromatic phenol containing a sulfonamido group, the nitrogen atom of which is directly linked to the carbon atom in meta-position to the phenolic hydroxyl group.

4. The process as defined in claim 1 wherein the aromatic phenol is selected from the class consisting of compounds of the following formulae:

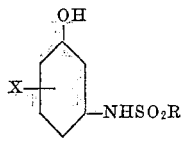

and

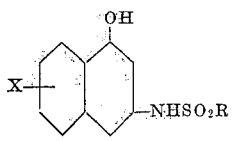

wherein R is selected from the class consisting of aliphatic and aromatic radicals and X is a member of the class consisting of hydrogen, alkyl, aromatic and sulfo radicals.

5. A photographic silver halide emulsion as defined in claim 2 wherein the aromatic phenol is selected from the class consisting of compounds of the following formulae:

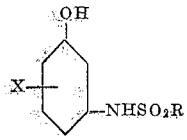

and

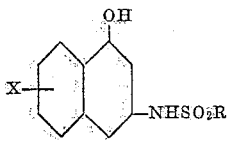

wherein R is selected from the class consisting of aliphatic and aromatic radicals and X is a member of the class consisting of hydrogen, alkyl, aromatic and sulfo radicals.

6. A photographic developer as defined in claim 3 wherein the aromatic phenol is selected from the class consisting of compounds of the following formulae:

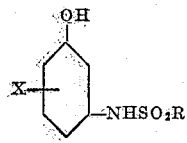

and

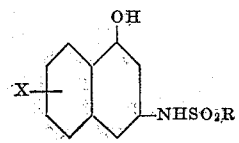

wherein R is selected from the class consisting of aliphatic and aromatic radicals and X is a member of the class consisting of hydrogen, alkyl, aromatic and sulfo radicals.

7. The process as defined in claim 1 wherein the aromatic phenol is 3'-hydroxy-p-toluenesulfonanilide.

8. The silver halide emulsion as defined in claim 2 wherein the aromatic phenol is 3'-hydroxyoctadecanesulfonanilide.

WILLY A. SCHMIDT.
JOSEPH A. SPRUNG.

REFERENCES CITED

The following references are of record in the file of this patent:

UNITED STATES PATENTS

| Number | Name | Date |
|---|---|---|
| 2,312,004 | Schneider et al. | Feb. 23, 1943 |
| 2,362,598 | Vittum et al. | Nov. 14, 1944 |
| 2,369,929 | Vittum et al. | Feb. 20, 2945 |
| 2,423,730 | Salminen et al. | July 8, 1947 |
| 2,441,491 | Kendall et al. | May 11, 1948 |